(12) United States Patent
Brockmeier

(10) Patent No.: US 9,924,628 B2
(45) Date of Patent: Mar. 27, 2018

(54) ADJUSTABLE SPACING FOR A CHAIN DRIVEN SEED METER

(71) Applicant: MONOSEM, Inc., Kansas City, KS (US)

(72) Inventor: Gary Gene Brockmeier, Linwood, KS (US)

( * ) Notice: Subject to any disclaimer, the term of this patent is extended or adjusted under 35 U.S.C. 154(b) by 0 days.

(21) Appl. No.: 15/131,412

(22) Filed: Apr. 18, 2016

(65) Prior Publication Data

US 2017/0295717 A1    Oct. 19, 2017

(51) Int. Cl.
 A01C 7/18    (2006.01)
 A01C 7/20    (2006.01)
 A01C 7/10    (2006.01)
 A01C 7/04    (2006.01)

(52) U.S. Cl.
 CPC ............ *A01C 7/102* (2013.01); *A01C 7/04* (2013.01); *A01C 7/107* (2013.01)

(58) Field of Classification Search
 CPC ........... A01C 7/10; A01C 7/102; A01C 7/107; A01C 21/005
 USPC ........................................................ 111/184
 See application file for complete search history.

(56) References Cited

U.S. PATENT DOCUMENTS

| | | | | |
|---|---|---|---|---|
| 2,667,286 | A * | 1/1954 | Raught | A01C 7/04 111/184 |
| 6,604,475 | B2 * | 8/2003 | Peterson | A01C 7/102 111/177 |
| 7,152,541 | B2 * | 12/2006 | Ptacek | A01C 19/00 111/185 |
| 7,377,221 | B1 | 5/2008 | Brockmeier | |
| 7,678,000 | B2 * | 3/2010 | Harnetiaux | F16H 7/1281 474/117 |
| 8,151,718 | B2 * | 4/2012 | Mariman | A01C 7/102 111/164 |
| 8,307,771 | B2 * | 11/2012 | Cannon | A01C 7/102 111/200 |
| 9,526,201 | B2 * | 12/2016 | Wendte | A01C 19/02 |
| 2012/0265410 | A1 * | 10/2012 | Graham | A01B 79/005 701/50 |

\* cited by examiner

*Primary Examiner* — John Weiss
(74) *Attorney, Agent, or Firm* — McKee, Voorhees & Sease, PLC

(57) ABSTRACT

An adjustment mechanism is provided for a multi-row seed planter to provide infinite adjustability of the seed discs to allow precision planting with staggered seed rows. The adjustment mechanism comprises an idler roller on the end of a pivotal arm about which the drive chain is trained. The position of the roller can be adjusted to modify the chain path, and thereby rotate the seed metering sprocket and associated seed disc to a desired angular position before planting begins.

26 Claims, 10 Drawing Sheets

ADJUSTABLE SPACING FOR A CHAIN DRIVEN SEED METER

BACKGROUND OF THE INVENTION

Some types of produce that are grown from seed, such as lettuce, typically are planted on raised beds with multiple seed lines or rows in each bed. The raised beds allow growers to irrigate crops with water through the furrows extending between adjacent beds. The multiple seed rows in each raised bed allow the growers to optimize crop yield per acre.

FIG. 1 shows a typical prior art three-row planting configuration with multiple raised beds 10 and a furrow 12 between each of the beds 10. Each bed has three lines or rows 14L, 14C, 14R, with the center row 14C being centered in the raised bed 10 and the left and right rows 14L and 14R being spaced nine inches from the center row 14C. Each bed typically has a 26 inch top width, while the furrows 12 are spaced approximately 40 inches center to center.

In the case of lettuce and other crops, it is common to over seed the seed lines 14L, 14C, 14R, and then later after the seeds have sprouted, come back through the field and manually thin each seed line to selectively kill unwanted plants, and thereby achieve a desired count or population per bed area. Preferably, the left and right outer lines 14L, 14R are staggered relative to the center line 14C, as shown in FIG. 2. For lettuce, the preferred spacing between each line 14L, 14C, and 14R is approximately nine inches on center, with preferred spacing of 11 inches between the desired plants or sprouted seeds in each row 14L, 14C, 14R, as shown in FIG. 3. This spacing and configuration optimizes the mature plant size, yield, and profit per acre. However, the manual thinning of undesired plants is expensive and wastes expensive seed. The spacing for other produce may be different than the spacing for lettuce.

More recently, precision planters with seed meters are utilized to minimize seed waste and reduce, but not eliminate, crop thinning to optimize the mature plant pattern. With precision planting, multiple seeds 16 are placed in each group 18 in each seed line 14L, 14C, 14R, so as to increase the likelihood of germination, compared to a group having only one or two seeds. The multi-seed group 18 is repeated at a desired distance (such as 11 inches on centers) to match the desired mature plant spacing. For example, each seed group 18 may include three seeds, as shown in FIGS. 4 and 5.

In practice, achieving the ideal stagger seed pattern in the field is not easy. The multi-seed group increases the likelihood of having a seed very near the ideal position, so that a skilled field worker can quickly visually identify and thin the appropriate unwanted plants.

This prior art precision planting practice almost always requires adjustment of the seed lines to achieve the desired pattern, which is not easy. Adjustment of the seed lines is typically achieved by jumping the drive chain on the seed meter sprocket, which is difficult to execute because the results of the adjustment are difficult to predict. Also, jumping the chain can only be made in finite, discreet amounts due to the sprocket teeth, with no ability for fine tuning the adjustment.

Another problem of precision planting is the inconsistent seed pattern from one field to the next field. This inconsistency arises due to seed depth adjustments to the row units, which affect the drive chain and sprocket geometry, and therefore affect seed placement and seed pattern for the bed.

Therefore, a primary objective of the present invention is the provision of a method and means for improved adjustability of a seed meter in a precision planting unit.

Another objective of the present invention is the provision of a precision planting unit that is more easily and more accurately adjustable.

A further objective of the present invention is the provision of an adjustment mechanism for precision planting unit seed meters that allows for infinite adjustability of the seed meter.

Still another objective of the present invention is the provision of an adjustment mechanism for a seed meter of a precision planting machine which can be quickly and easily adjusted for the desired seed position in a raised bed.

Yet another objective of the present invention is the provision of an adjustment mechanism for a seed meter which allows for quick and easy calibration before the planter is in the field.

Another objective of the present invention is a method of adjusting the drive chain of a seed meter to allow for fine tuning of the seed drop position.

Yet another objective of the present invention is the provision of a seed meter adjustment mechanism which is economical to manufacture and accurate in use.

These and other objectives will become apparent from the following description of the invention.

SUMMARY OF THE INVENTION

A precision planter includes multiple seed planting units to plant seeds in spaced apart lines in a field. Each planting unit has a seed disc to pick up, carry and dispense seeds. Each disc is rotated by a chain and sprocket assembly. An adjustment mechanism is provided one of two adjacent planting units to allow adjustment of the sprocket and seed discs of one planting unit relative to the other planting unit, before operation of the planter. The adjustment mechanism includes a roller about which the drive chain is trained, and mounted on a pivotal arm. The arm is connected to a threaded rod. Rotation of a nut on the rod moves the rod in opposite axial directions to raise and lower the pivot arm and the roller, and thereby modify the angular path of the chain, which in turn rotates the seed meter sprocket clockwise and counterclockwise to adjust the seed disc position out the one planter relative to the seed disc position of the other planting unit.

DETAILED DESCRIPTION OF THE PREFERRED EMBODIMENTS

The drawings show a three-row precision planter, as is typically used for planting lettuce seeds. It is understood that the adjustment mechanism of the present invention can be used on other multiple row precision planters having at least two planters in each row.

Figure 1:
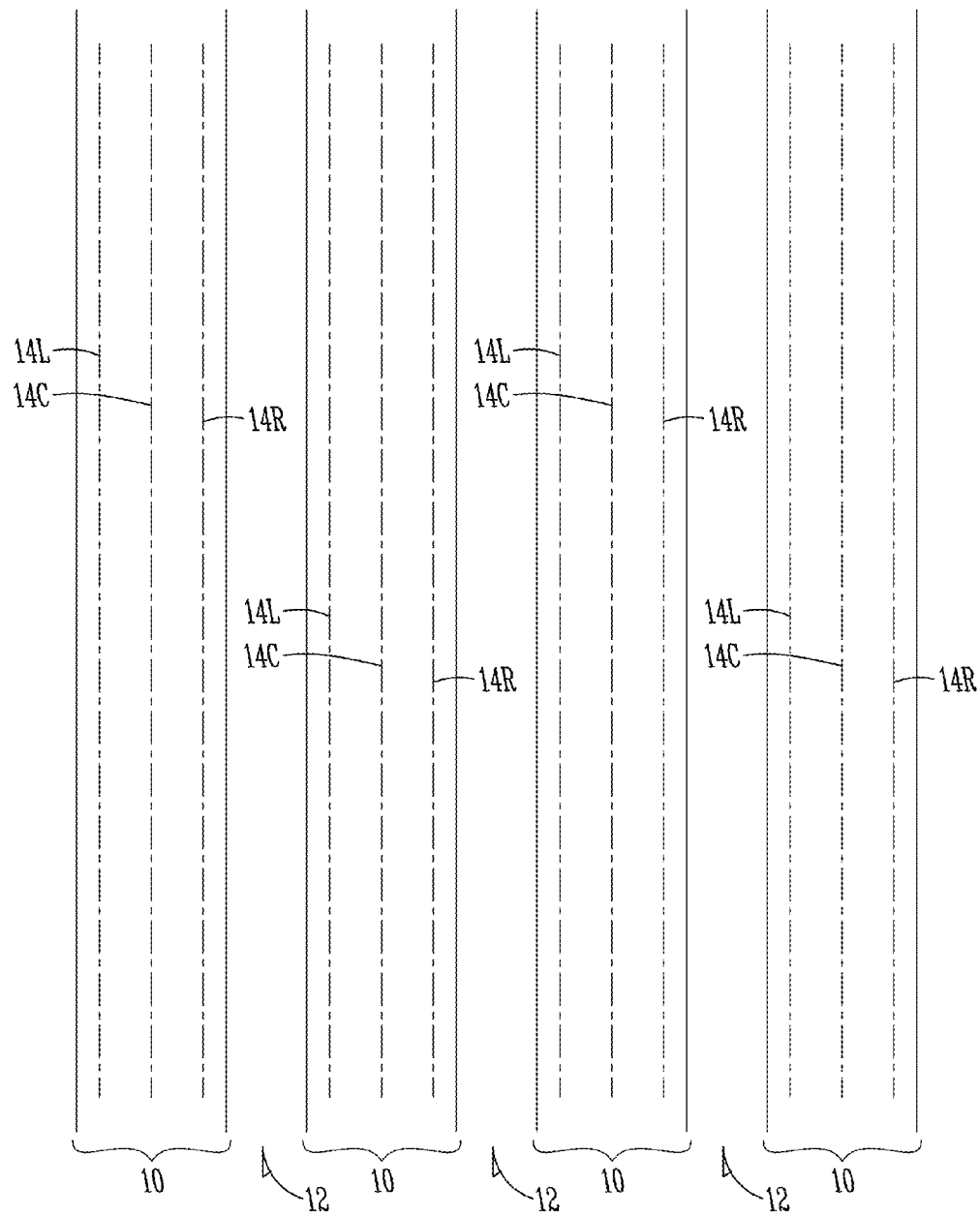
FIG. 1 is a schematic view of a conventional raised bed planting configuration with multiple seed rows in each bed.
Figure 2:
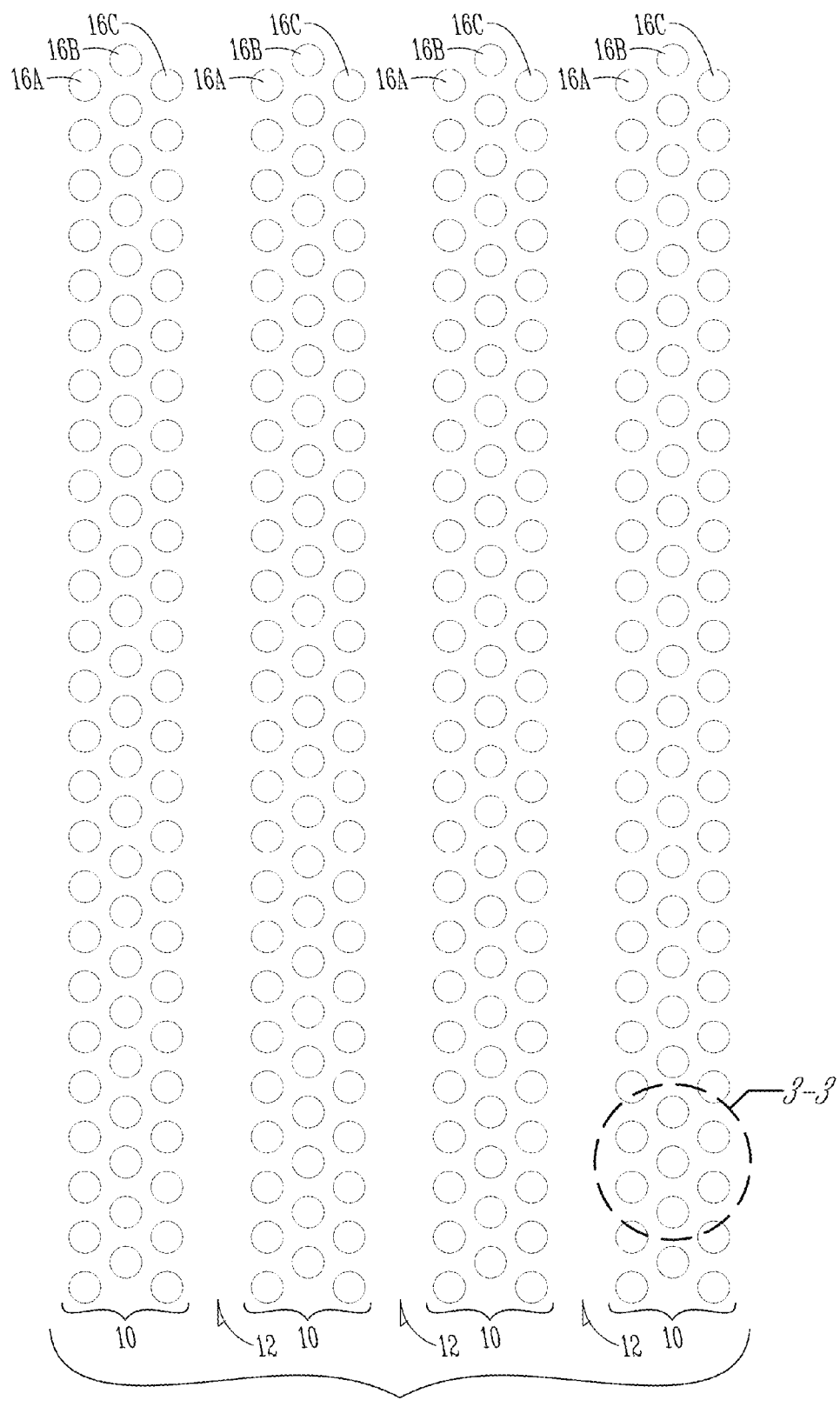
FIG. 2 is a schematic view showing seed groupings in each bed.
Figure 3:
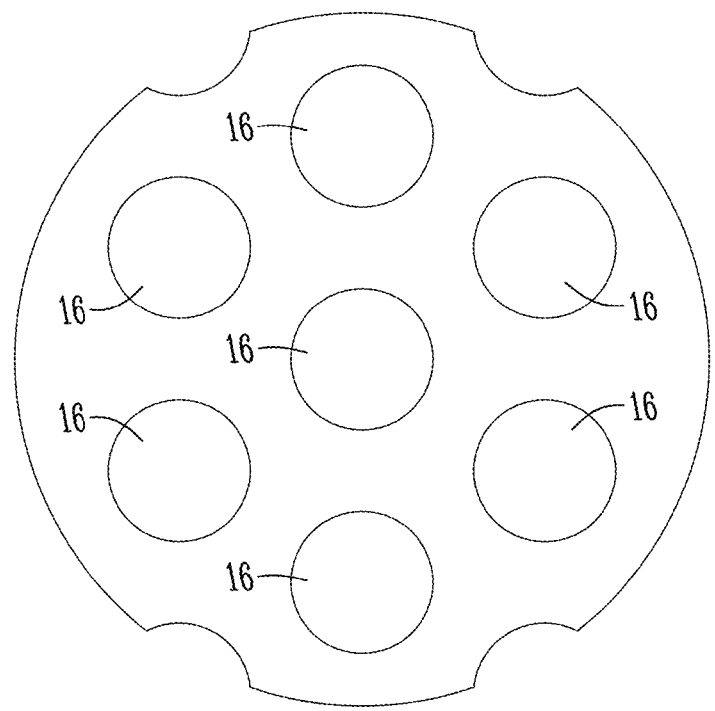
FIG. 3 is an enlarged view of the spacing between seed groups in a bed taken along lines 3-3 of FIG. 2.
Figure 4:
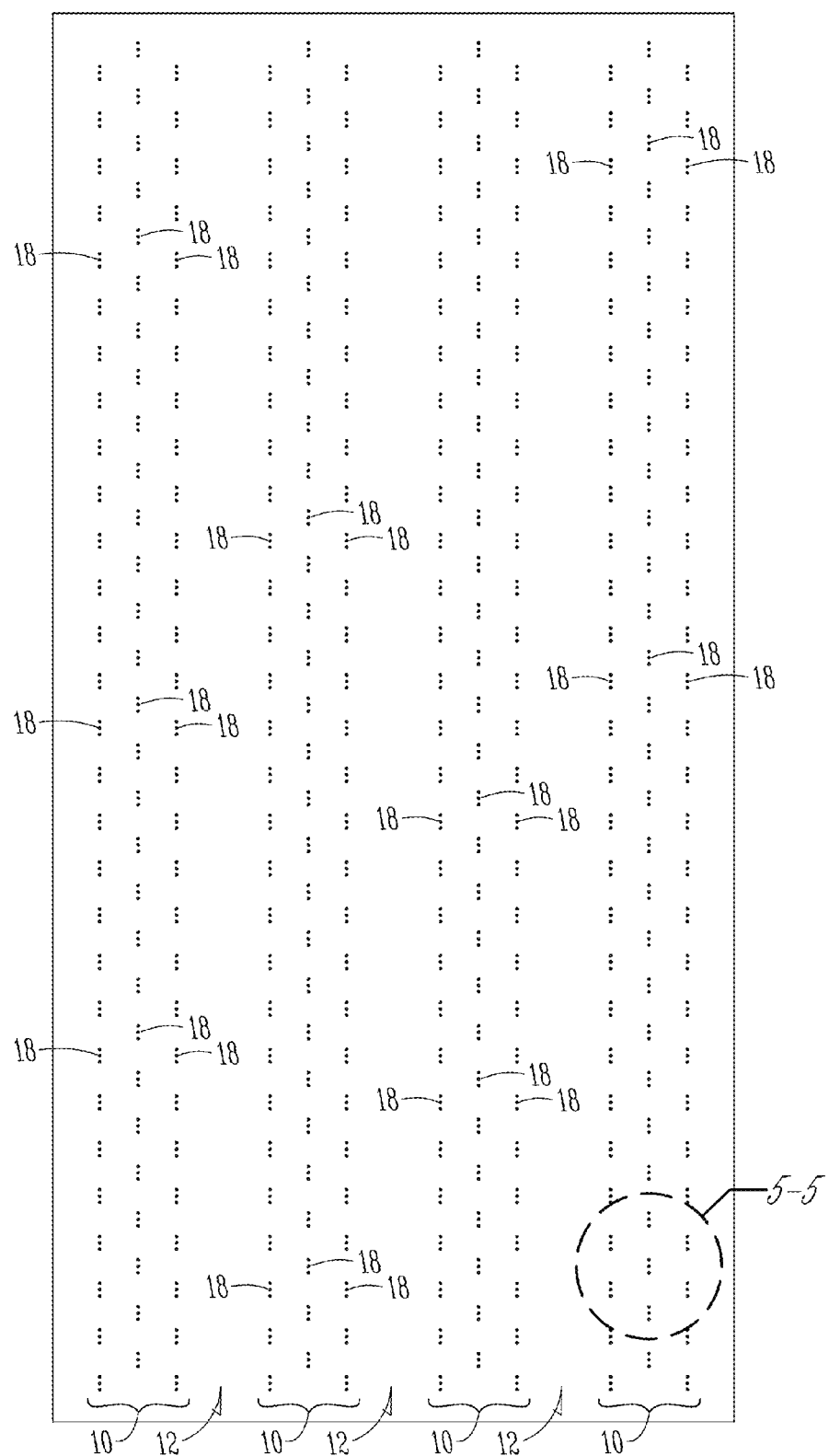
FIG. 4 is a schematic view showing a precision planting result with three seeds in each seed group.
Figure 5:
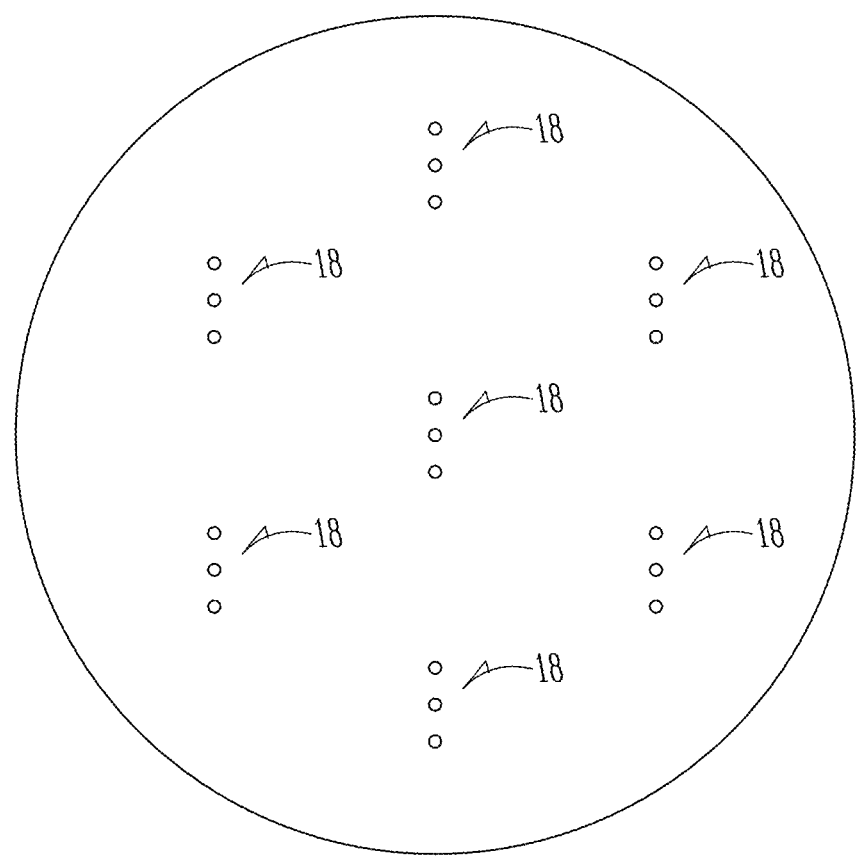
FIG. 5 is an enlarged view showing the spacing between the three-seed groups, taken along lines 5-5 of FIG. 4.
Figure 6:
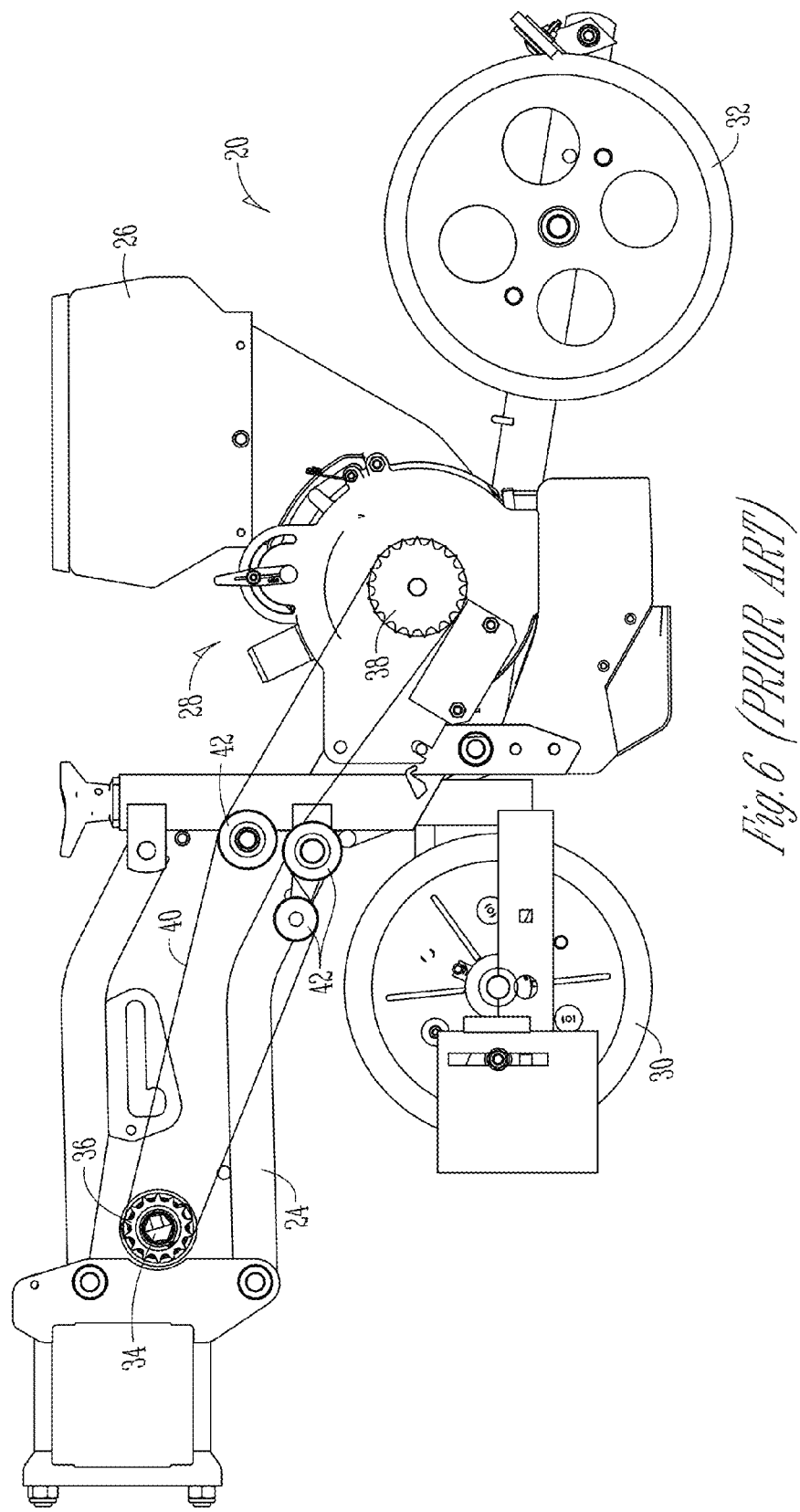
FIG. 6 is a view of a prior art chain drive assembly for precision planting unit.
Figure 7:
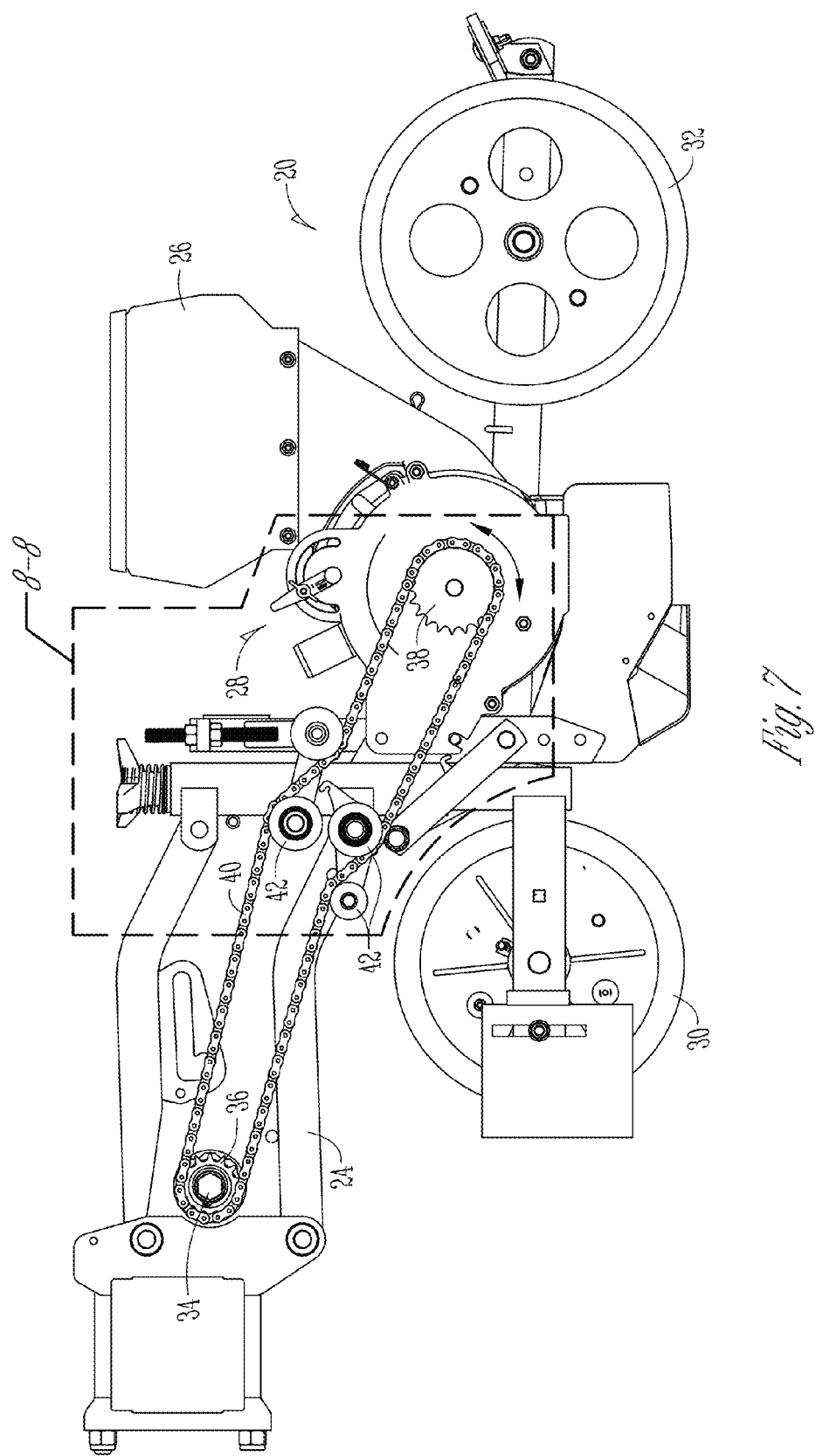
FIG. 7 is a side elevation view of a precision planting unit having the adjustment mechanism for the drive chain according to the present invention.
Figure 9:
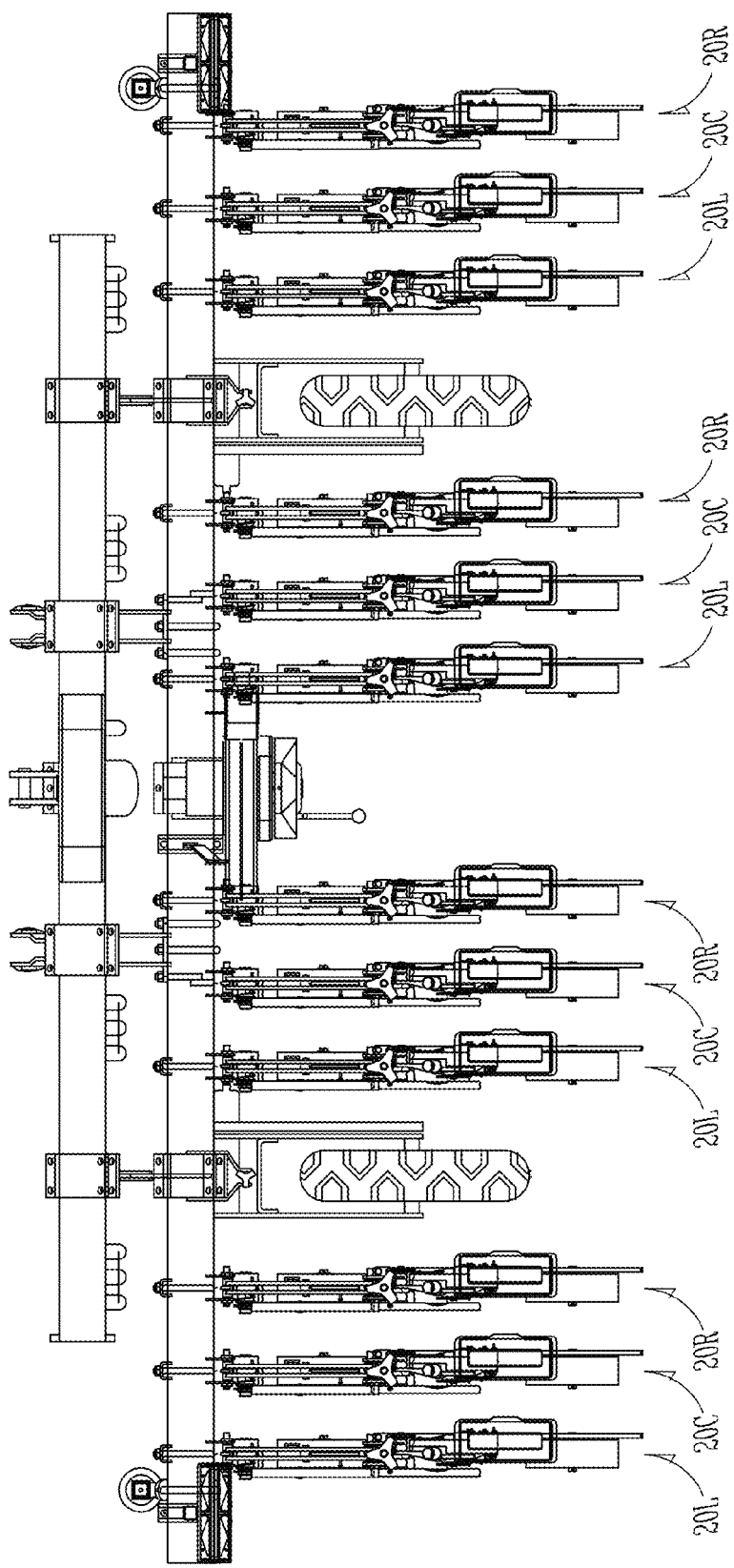
FIG. 9 is a top plan view of a tool bar having a series of three precision planting units mounted thereon, with the adjustment mechanism of the present invention provided on the outside left and right planters of each three-planter group.

Left, right and center planting units 20L, 20C, and 20R are grouped in sets of three for mounting on a toolbar 22, as shown in FIG. 9. As seen in FIG. 7, each planting unit 20L, 20C, 20R includes a frame 24 which supports a hopper 26 for holding seed, a seed metering assembly 28, depth gauge wheels 30, and a furrow closer 32. A drive shaft 34 with a sprocket 36 is operatively connected to a ground-drive wheel on the planter. Each planting unit 20L, 20C, and 20R, includes a chain drive assembly with a drive sprockets 36. A chain 40 is trained about the drive sprocket 36 and a metering sprocket 38.

Chain tensioner sprockets or rollers 42 are also provided to adjust the tension of the chain 40, as needed.

The present invention is directed to an adjustment mechanism 44 which adjusts the relative position of the seed disc of one planting unit relative to the seed disc of an adjacent planting unit. In the three-row planter, the adjustment mechanism 44 is provided on the left and right or outer planting units 20L, 20R in each three-unit set. No adjustment mechanism is provided on the center planting unit 20C.

Each adjustment mechanism 44 includes a support bracket 46 connected to the frame 24 and a threaded rod 48 extending through the bracket 46. Each adjustment mechanism 44 also includes an arm 50 pivotally mounted on the frame 24 with an idler roller 52 on the end of the arm 50. The rod 48 is operatively connected to the arm 50 in any convenient manner. A jam nut 54 on the rod 48 can be turned in opposite directions so that the rod 48 is movable in opposite axial directions, as indicated by the arrow 56 in FIG. 8. When the rod 48 moves upwardly and downwardly, the connected arm 50 and roller 52 move in upward and downward arcs, as indicated by the arrow 58 in FIG. 8.

Movement of the roller 52 changes the routing or path of the chain 40 between the sprocket 38 and the roller 52, thereby adjusting the angular position of the sprocket 38 and the seed disc 60, which is mounted on the same axis 62 as the sprocket 38. Thus, when the rod 48 and roller 52 are moved in upward and downward directions, the sprocket 38 and seed disc 60 rotate about the axis 62 in counterclockwise and clockwise directions, respectively, as indicated by the arrow 64 in FIG. 8. The threads on the rod 48 allow the angular adjustment of the seed disc 60 to be fine-tuned in very small increments, as compared to the prior art discreet increments from chain jumping. With the adjustment mechanisms 44 on the left and right planting units 20L, 20R, the relative positions of the seed discs on the left and right planting units relative to the seed disc of the center planting unit 20C can be accurately set before seeds are dispensed from the hoppers 26.

Figure 8:
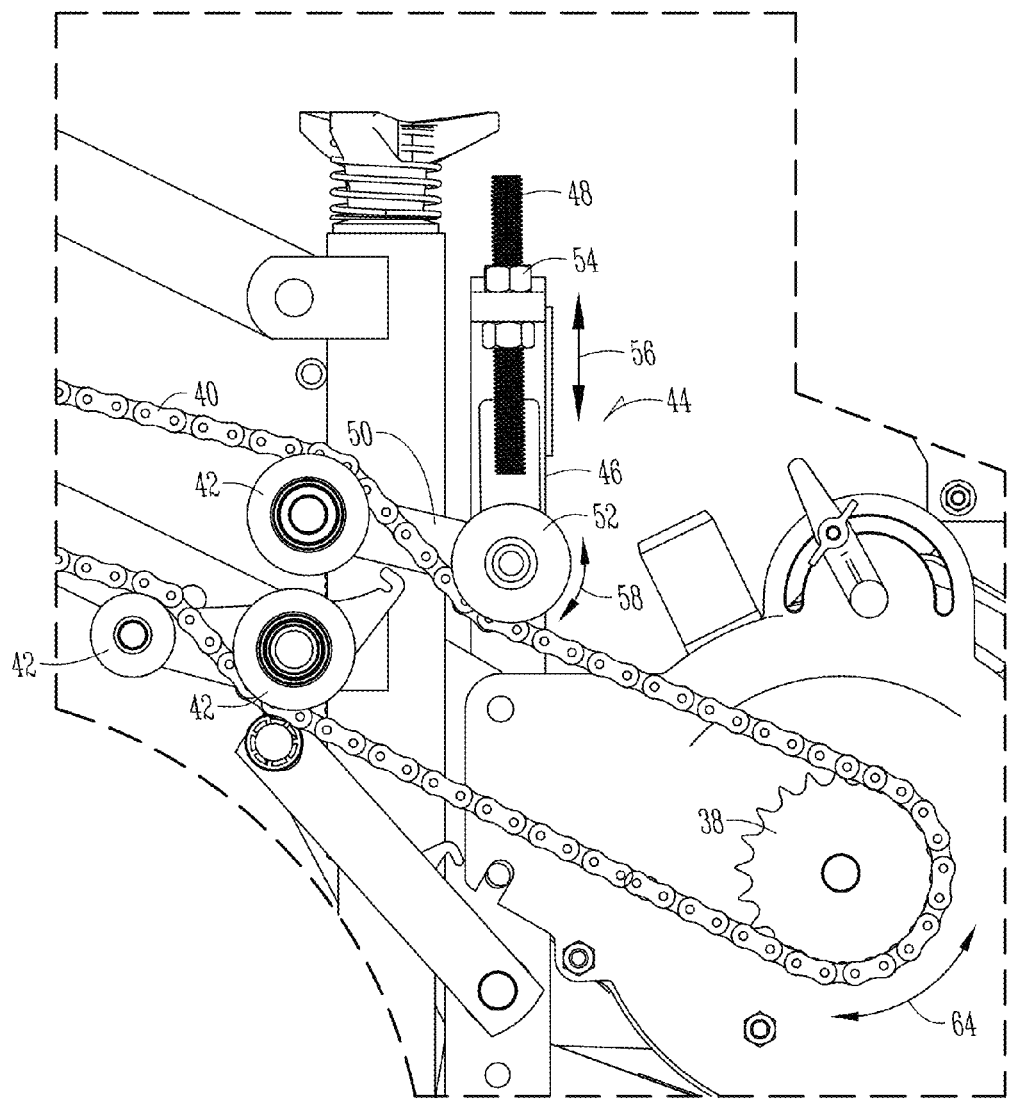
FIG. 8 is an enlarged view of the adjustment mechanism shown in FIG. 7.

An example of a seed disc 60 of the metering assembly 28 is shown in FIGS. 8-11. In this embodiment, the seed disc 60 has twelve sets of equally spaced seed pick-up holes 66, with three holes in each set. The holes 66 are spaced 30 degrees on center relative to the holes in the adjacent set. FIG. 8 shows the orientation of the disc 60 and holes for the center planting unit 20C, while FIG. 9 shows the orientation of the seed disc 60 and pick-up holes for the outer planting units 20L and 20R. The center seed disc 60C is shown with the uppermost set 66 of seed holes in a top dead center position. With twelve hole sets 66, the sets are equally spaced at 30 degree increments. The seed disc 60L or 60R, shown in FIG. 9, has the uppermost hole set offset one-half of the spacing, or 15 degrees, from top dead center so as to achieve the preferred offset or staggered spacing of the seeds of the outer rows relative to the seeds in the inner row, as shown in FIGS. 2-5. The seed discs 60 have a conventional structure and function.

Figure 10:
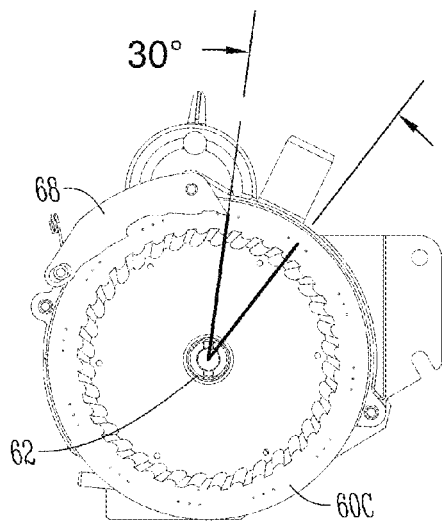
FIG. 10 is a side elevation view of a center seed meter disc with a prior art singulator.
Figure 11:
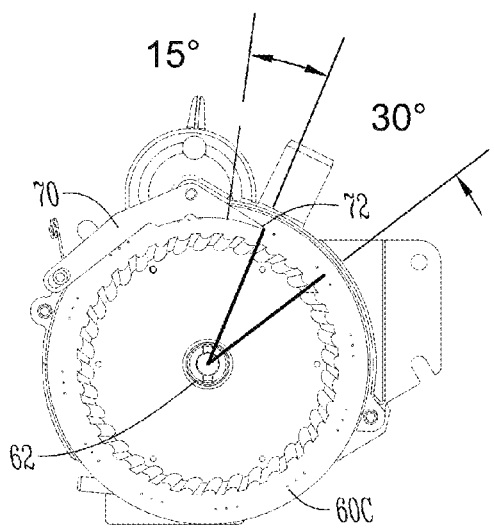
FIG. 11 is a side elevation view of the center seed meter disc with a calibration indicator according to the present invention.
Figure 12:
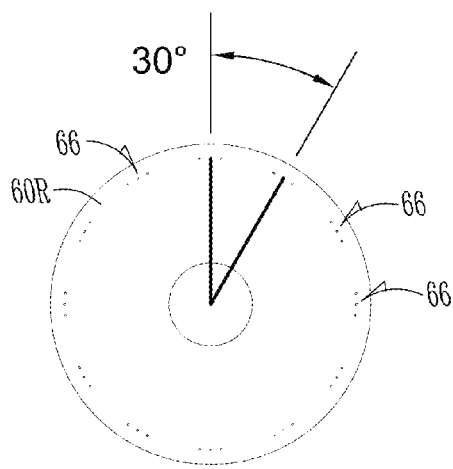
FIG. 12 is a side elevation view of one of the seed meter disc of an outer planting unit with holes for holding the seeds for each three seed group.
Figure 13:
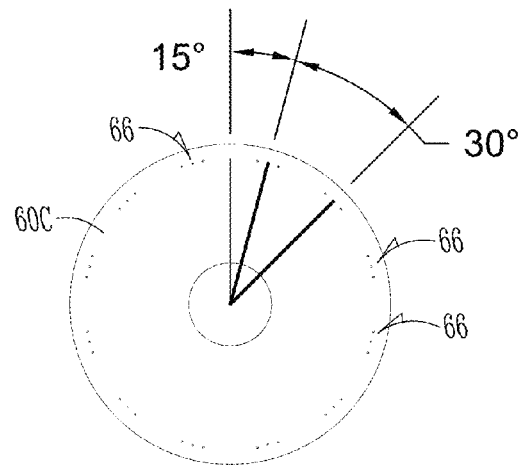
FIG. 13 is a side elevation view of a seed meter disc of a center planting unit.

FIG. 10 shows a standard seed singulator 68, which functions in a conventional manner. In order to calibrate the seed disc 60, the singulator 68 on the seed disc of the center planter 20C can be removed and an indicator 70 mounted in place of the singulator 68. The indicator 70 has an elongated tip 72 which corresponds to one-half the hole set spacing (15 degree angular position from top dead center for a 12 hole-set disc). With the indicator 70 mounted on the meter assembly 28 of the center planting unit 20C, the shaft 62 can be rotated to position the upper hole set 15 degrees from top dead center. Then, the seed discs 60 of the left and right planting units 20L, 20R can be set at zero degrees, or top dead center, using the adjustment mechanism 44.

It is understood that if the disc includes a different number of hole sets from that shown in the drawings, the angular relationships would be different than those in the 12 hole set disc. It is also understood that the adjustment mechanism 44 can be used on any multi-row planter wherein two or more adjacent seed rows are planted in a staggered pattern, with the adjustment mechanism 44 allowing infinite adjustability of the seed plates or discs to achieve accurate seed staggering between adjacent seed rows.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A seed planter, comprising:
a hopper to hold seed;
a seed meter to dispense seeds from the hopper;
the seed meter having a sprocket;
a drive shaft with a sprocket;
a chain trained about the drive shaft sprocket and the seed meter sprocket;
a threaded adjustment rod to adjust an angle of a section of the chain and thereby rotate the seed meter sprocket to adjust dispensement of the seed.

2. The seed planter of claim 1 wherein the rod is connected to a pivotal arm with a roller, with the chain trained about the roller.

3. The seed planter of claim 2 wherein the rod is movable in opposite axial directions to pivot the arm in opposite directions and thereby move the chain in opposite directions, so as to rotate the seed meter sprocket in opposite directions.

4. The seed planter of claim 1 wherein movement of the rod in a first direction rotates the seed meter sprocket in a first direction and movement of the rod in an opposite second direction rotates the seed meter sprocket in an opposite second direction.

5. The seed planter of claim 1 further comprising a seed disc connected to the seed meter sprocket for rotation with the seed meter sprocket.

6. A triple row seed planter, comprising:
left, center and right planting units to plant seeds in spaced apart lines in a single raised bed;
each planting unit have a seed disc with a sprocket;
a drive shaft with first, second and third sprockets;
first, second and third chains trained about the left, center and right planting unit sprockets and the first, second and third drive shaft sprockets, respectively;
left and right adjustment rods on left and right planting units to adjust the seed discs of the left and right planting units relative to the seed disc of the center planting unit.

7. The triple row seed planter of claim 6 wherein left and right rollers are associated with the left and right rods, respectively, and the first and third chains are trained over the left and right rollers, respectively.

8. The triple row seed planter of claim 7 wherein the left and right rollers are mounted on left and right pivot arms, respectively, so as to adjust the angle of the first and third chains when the left and right rods are moved axially.

9. The triple row seed planter of claim 6 wherein the left and right rods are each movable in opposite axial directions so as to rotate the seed discs of the left and right planting units, respectively, in opposite directions.

10. The triple row seed planter of claim 6 wherein the seed disc of the center planting unit has an indicator to set an angular orientation of the center planting unit seed disc.

11. A seed planter, comprising:
a hopper to hold seed;
a seed meter to dispense seeds from the hopper;
the seed meter having a sprocket;
a drive shaft with a sprocket;
a chain trained about the drive shaft sprocket and the seed meter sprocket to define a first chain segment extending from the drive shaft sprocket to the seed meter sprocket and a second chain segment extending from the seed meter sprocket to the drive shaft sprocket;
a chain tensioning roller on one of the chain segments to adjust tension of the chain; and
a roller about which the other one of the chain segments is trained, and being movably mounted so as to adjust the chain path, and thereby adjust the angular position of the seed meter sprocket.

12. The seed planter of claim 11 wherein the roller is mounted on a pivotal arm.

13. The seed planter of claim 12 wherein pivotal movement of the arm is controlled by axial movement of a rod.

14. The seed planter of claim 13 wherein the rod is movable in opposite axial directions to pivot the arm in opposite directions and thereby move the chain in opposite directions, so as to rotate the seed meter sprocket in opposite directions.

15. The seed planter of claim 11 further comprising a seed disc connected to the seed meter sprocket for rotation with the seed meter sprocket.

16. A method of adjusting a drop point for a seed from a seed meter on a seed planter, the seed meter having a sprocket driven by a chain having first and second segments on opposite upstream and downstream sides of the sprocket and a seed disc connected to the sprocket, the method comprising:
changing a path of the first chain segment so as to rotate an initial position of the sprocket, and thereby adjust a start position of the seed disc; and
adjustably tensioning the second chain segment.

17. The method of claim 16 wherein the chain path is changed by moving a pivot axis of a roller about which the chain is trained.

18. The method of claim 17 wherein the roller moves about an arc.

19. The method of claim 17 further comprising controlling the pivot axis movement with movement of a rod.

20. The method of claim 19 wherein the rod is movable in opposite axial directions to move the roller axis in opposite directions, and thereby move the sprocket initial position in opposite directions.

21. A seed planter, comprising:
a hopper to hold seed;
a seed meter to dispense seeds from the hopper;
the seed meter having a sprocket;
a drive shaft with a sprocket;
a chain trained about the drive shaft sprocket and the seed meter sprocket;
a roller about which the chain is trained, and being movably mounted so as to adjust the chain path, and thereby adjust the angular position of the seed meter sprocket;
wherein the roller is mounted on a pivotal arm; and
wherein pivotal movement of the arm is controlled by axial movement of a rod.

22. The seed planter of claim 21 wherein the rod is movable in opposite axial directions to pivot the arm in opposite directions and thereby move the chain in opposite directions, so as to rotate the seed meter sprocket in opposite directions.

23. The seed planter of claim 21 further comprising a seed disc connected to the seed meter sprocket for rotation with the seed meter sprocket.

24. A method of adjusting a drop point for a seed from a seed meter on a seed planter, the seed meter having a sprocket driven by a chain and a seed disc connected to the sprocket, the method comprising:
changing a path of the chain on one side of the sprocket so as to rotate an initial position of the sprocket, and thereby adjust a start position of the seed disc;
wherein the chain path is changed by moving a pivot axis of a roller about which the chain is trained; and
controlling the pivot axis movement with movement of a rod.

25. The method of claim 24 wherein the roller moves about an arc.

26. The method of claim 24 wherein the rod is movable in opposite axial directions to move the roller axis in opposite directions, and thereby move the sprocket initial position in opposite directions.

* * * * *